June 17, 1969  I. L. LOOKER  3,450,218
PLANETARY GEAR TYPE STEERING DEVICE FOR TRACK VEHICLES
Filed May 24, 1967
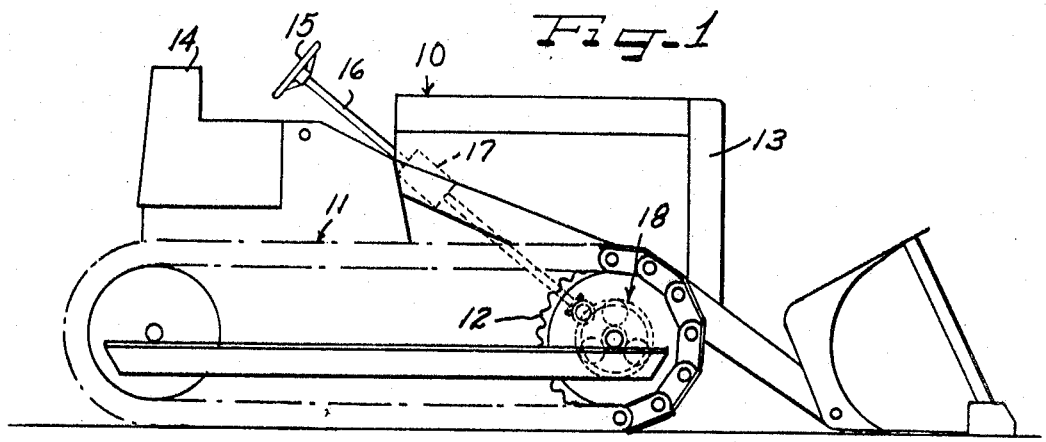
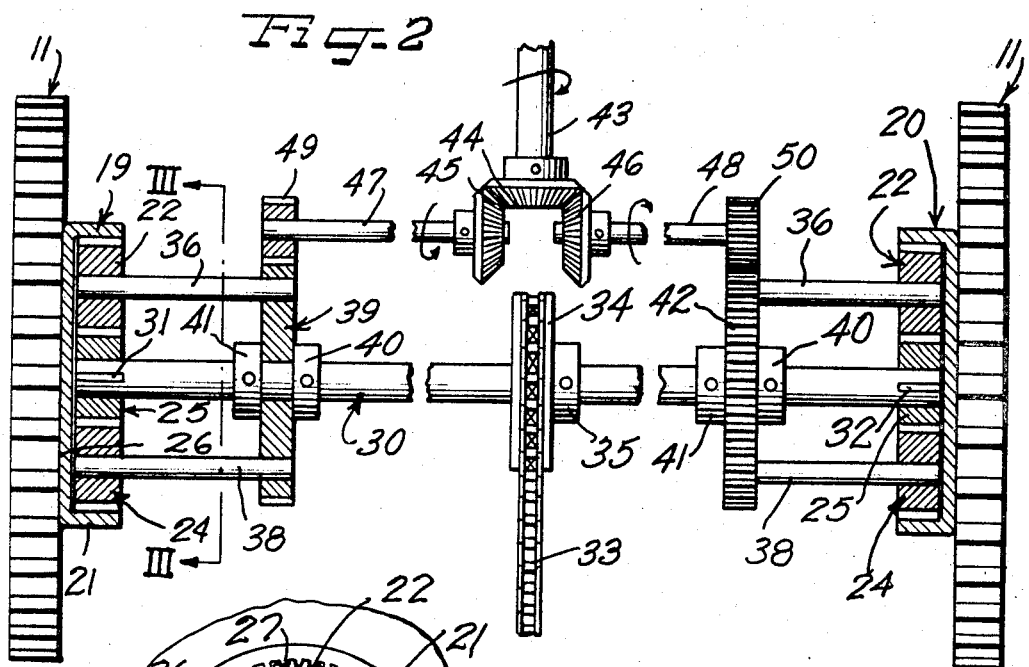
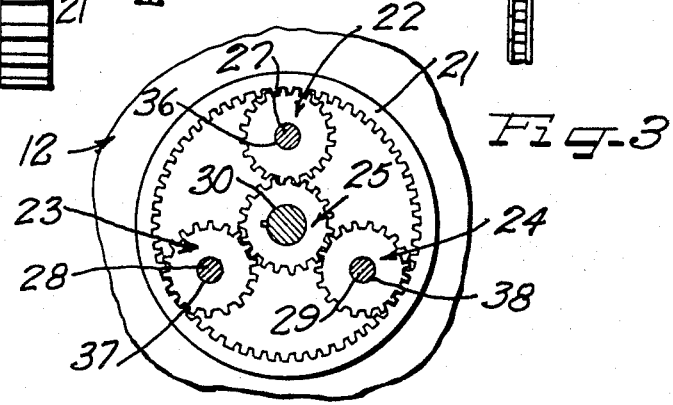
INVENTOR.
Ivan L. Looker

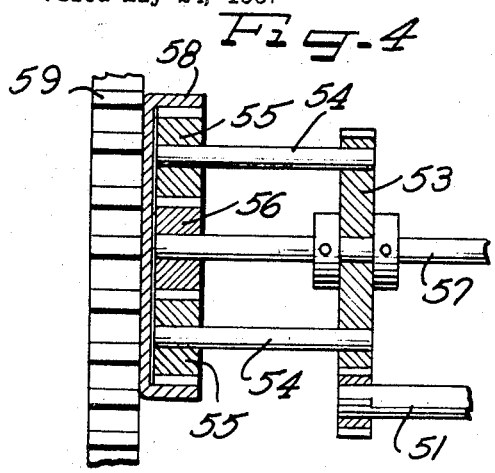
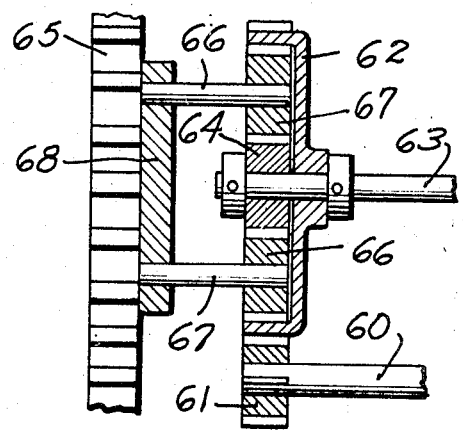
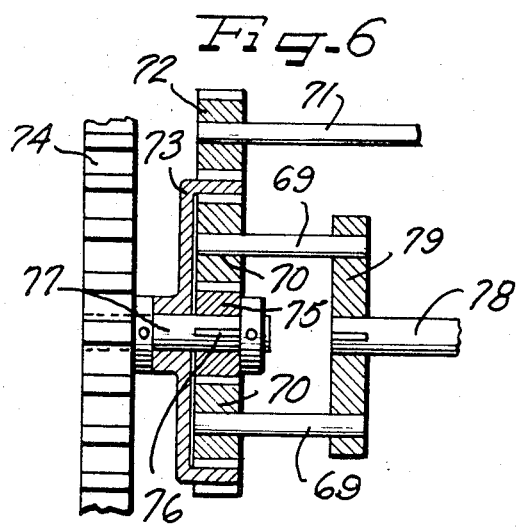
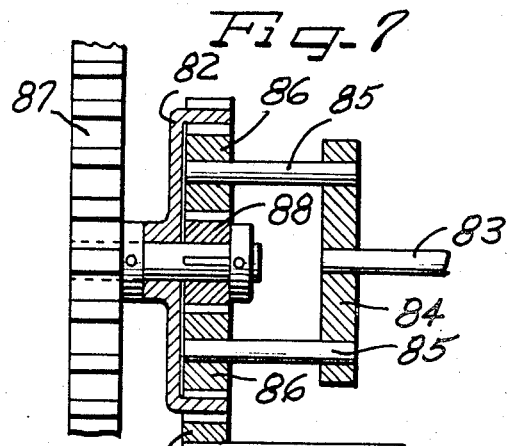
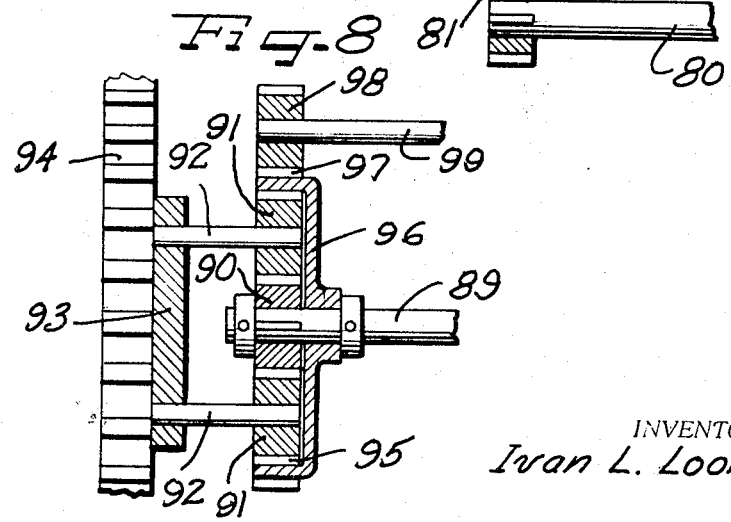

United States Patent Office 3,450,218
Patented June 17, 1969

3,450,218
PLANETARY GEAR TYPE STEERING DEVICE FOR TRACK VEHICLES
Ivan L. Looker, 560 E. Mulberry St.,
Watseka, Ill. 60970
Filed May 24, 1967, Ser. No. 640,913
Int. Cl. B62d 11/04, 11/10; F16h 37/06
U.S. Cl. 180—6.44                                 10 Claims

ABSTRACT OF THE DISCLOSURE

A steering system for a track vehicle having a planetary gear set attached to each of the track driving wheels wherein a sun gear is driven at each of the gear sets through a common axle and a ring gear drives the respective tracks through a set of planets meshed between the sun gear and the ring gear. The planets have their axes fixed relative to one another, and means are provided to revolve the axes of each planet set in opposite rotational directions about the respective sun gears to back peddle or forward peddle thereby generating a relative speed between the respective ring gears. The steering drive shafts which revolve the respective planet sets in opposite rotary senses is operated by a drive motor which is responsive to the angular deviation of a steering wheel from a neutral position.

Background of the invention

*Field of the invention.*—The field of art to which this invention pertains is a steering-by-driving device for a track type vehicle or the like and, in particular, to a steering device for effectively and efficiently developing relative speeds between the opposite tracks of such a vehicle.

Summary

It is an important feature of the present invention to provide a steering device for a track type vehicle which effectively and efficiently allows the turning of the vehicle by selectively altering the relative speeds of the opposite tracks.

It is also a feature of the present invention to provide a steering device for a motor vehicle wherein the steering device alters the relative speeds of opposing drive wheels substantially independently of the driving motor force for the forward or rearward movement of the vehicle.

It is an object of the present invention to provide a steering device for a track type or like vehicle wherein a planetary gear set is provided to directly drive the respective tracks and wherein the axes of a set of planets in each gear set are fixed relative to one another and driven in a fixed relationship in opposing directions for developing a relative speed between the respective tracks.

It is another object of the present invention to provide a steering device for a track type or the like vehicle having a planetary gear set affixed to each of the track driving gears such that a sun gear in each gear set is driven through a common axle by a principal motor means to propel the vehicle in a forward or rearward direction and wherein a set of planets are disposed between the sun gear and a ring gear and means are provided to back peddle or forward peddle the planets to develop a relative speed between the opposite tracks of the vehicle.

It is also an object of this invention to provide a steering device for a track vehicle having a planetary gear set affixed to each of the track driving gears, wherein a sun gear is connected by a common axle to the sun gear of the opposing track, and wherein a ring gear in each gear set is coupled to drive the tracks directly, and wherein the relative speed between the ring gear and the sun gear in each set is controlled by the speed and direction of revolution of the set of planets which is meshed between the sun gear and the ring gear.

It is an additional object of this invention to provide a steering device for a track vehicle as described above wherein the ring gear is driven through a common axle by a principal motor means for propelling the vehicle in a forward and rearward direction and wherein a sun gear is coupled to drive the tracks of the vehicle directly and wherein a number of planets in each gear set associated with each track of the vehicle are coupled together in a fixed axial relationship and driven either in a clockwise or counterclockwise revolution about the sun gear to develop a relative speed between the opposite tracks of the vehicle.

It is an additional object of this invention to provide a steering device for a track vehicle of the type described above wherein the axes of each planet gear set are rotatable in opposite directions by means of a steering shaft which is driven by a motor means, and wherein the motor means is responsive to the angular deviation of a steering wheel from a given neutral position.

It is also an object of this invention to provide a steering type device for a track vehicle as described above wherein the axes of each set of planets are rigidly affixed to respective further ring gears and wherein said further ring gears are driven in opposite directions to accomplish the desired relative speeds between the opposite tracks of the vehicle.

These and other objects, features and advantages of the present invention will be understood in greater detail from the following description and the associated drawings wherein reference numerals are utilized in designating an illustrative embodiment.

Brief description of the drawings

FIGURE 1 is a diagrammatic view of a track type vehicle utilizing the steering type device of the present invention;

FIGURE 2 is a diagrammatic illustration of the steering, drive and gearing arrangement employed to steer a track type vehicle in accordance with the present invention;

FIGURE 3 is a sectional view taken along the lines III—III of FIGURE 2 and showing the relationship of the sun, planets, and ring gear of a planetary gear set of the present invention;

FIGURE 4 is a sectional view similar to the view shown in FIGURE 2 and showing an alternate arrangement according to the present invention wherein the steering function is accomplished through the sun gear of the planetary gear set;

FIGURE 5 is a sectional view similar to FIGURE 2 wherein the main vehicle drive is coupled to the ring gear and wherein the vehicle track is driven by the rotary motion of the planetary gear axes;

FIGURE 6 is a further embodiment of the present invention wherein the main drive power is coupled directly to the axes of the planetary gears and wherein the drive for the vehicle track is taken directly from the sun gear thereof;

FIGURE 7 is a further embodiment of the present invention wherein the steering control is coupled directly to the axes of the planetary gear set and wherein the track vehicle drive is accomplished at the sun gear; and FIGURE 8 is also an alternate embodiment of the present invention wherein the main drive is coupled directly to the sun gear of the planetary gear set and wherein the drive for the vehicle tracks is taken from the rotary motion of the planetary gear axes.

Description of the preferred embodiment

A track vehicle 10 is illustrated in FIGURE 1 as a typical vehicle which may employ the steering device of the present invention.

The track vehicle 10 includes a pair of tracks 11 disposed at opposite sides of the vehicle and which are driven through a sprocketed wheel 12. A main drive motor 13 is positioned at the fore end of the vehicle and provides the principal motive power for the forward and rearward movement of the tracks 11. A cab 14 provides a position from which an operator may steer his track vehicle through the use of a typical steering wheel 15. The steering wheel 15 is coupled through a steering shaft 16 and a steering motor 17 to the steering device 18 of the present invention.

Various systems have been devised in the past to accomplish steering of the vehicle of FIGURE 1. Principally, it has been recognized that to steer such a vehicle, means must be employed to develop a relative speed differential between the two tracks. This has in the past been accomplished in a variety of ways, the most common of which is to provide a braking means for physically retarding the forward movement of one of the tracks relative to the other track. In such a system, the power for steering is derived from the main motive power of the vehicle, and the relative speed or speed differential is accomplished merely by physically retarding the forward movement of one track relative to the other.

Other more sophisticated systems for steering utilize transmissions and planetary gearing systems of various forms together with clutch mechanisms and braking systems for effecting a speed differential between the tracks. Other systems, utilized independently controlled motive power for each of the tracks which permits one track to be placed in a neutral or rearward moving position, while the other track is moved forwardly thereby generating the proper turning motion about the vehicle vertical axis. All of these proposed systems, however, have been complex and additionally undesirable for reasons which are specific to each type of system.

The present invention, however, provides a simplified, efficient and effective means for developing a speed differential between the tracks and for doing so in a selected manner for controlling the turning of the vehicle.

The steering system of the present invention is shown more clearly in FIGURE 2 as including a pair of planetary gear sets 19 and 20 which are disposed at opposite sides of the vehicle adjacent the tracks 11. Each planetary gear set includes a ring gear 21, three planet gears 22, 23 and 24 and a central or sun gear 25.

The ring gear 21 has a backing plate or web 26 which is affixed directly to the sprocket wheel 12 (FIGURE 1) to drive the same and hence to drive the track 11.

In the embodiment shown in FIGURE 2, the main driving force originates with the sun gear 25. The sun gear 25 drives the planets 22, 23 and 24 and hence may be referred to as a driving gear, and the planets 22, 23 and 24 rotate about their respective axes, 27, 28 and 29, to transmit the torque from the sun gear to the ring gear 21. The ring gear 21 in turn drives the sprocket wheel 12 and hence may also be referred to as a driving gear.

The sun gears 25 of each planetary gear set are coupled through a common drive shaft 30. The drive shaft 30 is fixedly coupled to the respective sun gears at keyways 31 and 32.

The main driving power for the vehicle 10 is accomplished through a chain drive 33 to a sprocketed wheel 34 which is rigidly mounted at a collar 35 to the drive shaft 30. The main motive force for the chain 33 originates at the principal drive motor 13.

It is apparent, therefore, from a study of FIGURES 2 and 3 that if the axes 27, 28 and 29 of the respective planets remain substantially fixed with respect to each other and with respect to the axes of the drive shaft 30, the planets will rotate about their axes and drive the respective ring gears and hence move the vehicle in a forward or rearward direction depending upon the direction of movement of the chain drive 33.

If steering of the vehicle either to the left or to the right is desired, however, it is not necessary to interfer with the main drive power to the shaft 30. The direction of turn of the vehicle is accomplished by providing a means to resolve the planets as a set about the sun gear 25 and thereby effect the relative speed between the sun gear and the associated ring gear. Furthermore, means are provided to revolve the axes of the planet gears of each gear set in opposite directions, thereby decreasing the speed of one track and correspondingly increasing the speed of the opposite track. Since the planets 22, 23 and 24 control the relative speed between the tracks, they may be properly referred to as control gears which regulate the relative speeds between the two driving gears 25 and 21.

The means by which the planets control or regulate the relative speed between the sun and ring gears comprises essentially a set of shafts 36, 37 and 38 which are rigidly affixed to the centers of each of the planet gears 22, 23 and 24, respectively. The shafts 36, 37 and 38 are then fixed to a further ring gear 39 which is freely mounted around the shaft 30 and which is rotatable relative to the shaft 30, being positioned axially therealong by a pair of collars 40 and 41 which are secured to the shaft 30 as indicated.

It is, apparent, therefore, that by rotating the ring gear 39, the shafts 36, 37 and 38 and hence the axes of the planets 22, 23 and 24 will be caused to revolve in one or the other direction about the axis of the sun gear 25.

The means for rotating the ring gear 39 and its counterpart 42 at the opposite side of the vehicle includes a steering drive shaft 43 which has a bevel gear 44 rigidly fixed to one end thereof and which drives first and second additional bevel gears 45 and 46. The bevel gears 45 and 46 are rigidly coupled to a pair of steering shafts 47 and 48, respectively. The shafts 47 and 48 are then connected to pinions 49 and 50 which are meshed with the respective ring gears 39 and 42.

It will be understood that a consideration of FIGURE 2 that rotation of the steering drive shaft 43 in the direction indicated by the arrow, for instance, will result in opposite rotational directions for the shafts 47 and 48 as also indicated by the arrows thereon. Accordingly, the axes of the planet gears of each gear set will be revolved through their respective ring gears 39 and 42 in opposite rotational senses thereby adding or subtracting from the speed of the ring gear. In this way, a relative speed is accomplished between the tracks of the vehicle and allows the vehicle to turn as desired.

The relative speed or speed diffrential which is accomplished between the tracks of the vehicle will depend on the speed differential which is generated between the planet axes of each of the gear sets. Of course, this speed differential is a direct function of the speed of the steering drive shaft 43.

To accomplish different turning or steering motions, the speed of the drive shaft must be variable. Accordingly, the motor 17 is provided to be a variable speed motor which is controlled by the angular position of the steering wheel 15. By turning the steering wheel 15 to the left, for instance, the motor 17 may be actuated in a well understood manner to rotate the shaft 43 in a direction which will reduce the speed of the left-hand track and increase the speed of the right-hand track. This will result in a turning of the vehicle toward the left. The sharpness or radius of the turn will be dictated by the amount of angular deviation of the steering wheel 15 from a normal or neutral position. Excessive deviation increases the speed of the shaft 43 and increases the speed differential between the respective tracks for accomplishing a sharp turning motion. By turning the steering wheel 15 in the opposite direction, the direction of the motor 17 is reversed to turn the vehicle toward the right.

While reference has been made throughout the foregoing description to the word "track," the various embodiments of this invention are not limited to the track type drive shown in the drawings and are equally applicable to other wheel type drives as well.

The steering control system shown in FIGURE 2 is illustrative only of the steering control contemplated by the present invention. Alternate arrangements such as those shown in FIGURES 4 through 8 may also be employed.

FIGURE 4 shows an embodiment wherein the main drive power for the forward and rearward motion of the vehicle is coupled to a shaft 51 and a pinion 52 to drive a ring gear 53. The ring gear 53 has the axes 54 of a series of planet gears 55 rigidly affixed thereto. Rotation of the ring gear 53, therefore, causes revolution of the planets 55 about a sun gear 56. The steering control shaft is coupled to a shaft 57 which in turn is rigidly affixed to the sun gear 56. Normally, the sun gear 56 is stationary and the main drive shaft 51 causes the planets 55 to revolve about the sun gear 56 and carry a ring gear 58 for driving the vehicle track 59. By turning the shaft 57 in one of the two possible directions, the drive through the planets to the ring gear 58 can be reduced or increased thereby developing a speed differential between the respective wheels similar to the differential developed by the system of FIGURE 2.

In the embodiment shown in FIGURE 5, the main drive is coupled to a shaft 60 and a pinion 61 which in turn rotate a ring gear 62. The steering or control shaft is coupled to a shaft 63 which in turn rotates a sun gear 64. The output to the vehicle track 65 is taken from the revolution of a set of shafts 66 which are coupled both to the planets 67 and to a backing plate 68 which in turn is affixed to the sprocketed drive of the track 65.

FIGURE 6 shows an embodiment wherein the main motor drive is coupled directly to the axes 69 of the set of planets 70. The control or steering mechanism is connected to a shaft 71 and a pinion 72 which drives a ring gear 73. The power takeoff to the track 74 is from a sun gear 75 which is keyed as at 76 to a main drive shaft 77. The main drive to the axes 69 of the planets 70 is accomplished through a central shaft 78 to a drive plate 79 which is rigidly affixed to the set of shafts 69 which form the axes of the planets 70.

In the embodiment shown in FIGURE 7, the main drive is coupled to a shaft 80 and a pinion 81 for rotating a ring gear 82. The control or steering function is accomplished through a shaft 83 and a drive plate 84 to a series of shafts 85 which form the axes of the pinions 86. The power takeoff for the vehicle track 87 is accomplished from a sun gear 88 which is meshed with the planets 86.

In FIGURE 8, the main motor drive is coupled to a shaft 89 and to a sun gear 90 for driving a set of planets 91. The planets 91 have axis or shafts 92 which are rigidly affixed to a drive plate 93 for driving the vehicle track 94. The pinions 91 mesh with the sun gear 90 and with the internal gear 95 of a ring gear 96. The ring gear 96 also has an external gear 97 which meshes with a pinion 98. The pinion 98 is driven by a shaft 99 which in turn is coupled to the steering motor drive.

It is apparent, then, that various modifications and combinations of the features of this invention may be accomplished by those skilled in the art.

I claim:
1. A vehicle steering system comprising:
first and second wheel driving units,
each of said driving units having first and second driver gears and a plurality of control gears,
said first driver gear being a sun gear, said second driver gear being a ring gear, and said control gears being a series of planetary gears operably disposed about the sun gear and meshed between the sun and ring gears to form a planetary gear system therewith,
one of said first and second driver gears of each of said driver units being coupled to a wheel on opposite sides of the vehicle for driving the same,
a motor drive means,
the other of said first and second driver gears of each of said driver units being coupled to said motor drive means for being rotated in the same angular sense by the same,
said planetary gears each being free to rotate on their own axis for transmitting torque from said other driver gear to said one driver gear,
a series of shafts,
each of said planetary gears being mounted on one of said shafts,
a shaft carrier member,
said shaft carrier member being coupled to each of said shafts,
means for controllably revolving said shaft carrier member and hence revolving the axes of the planetary gears of each driving unit for varying the speed of said one driver gear independently of the speed of said other driver gear,
whereby said wheels on opposite sides of the vehicle may be driven at variable speeds to control the turn-movement of the vehicle.

2. A vehicle steering system in accordance with claim 1 wherein means are provided to drivingly revolve the shaft carrier of each driving unit in opposite rotary senses at substantially uniform speeds.

3. A vehicle steering system in accordance with claim 1 wherein a steering shaft and means to manually rotate said shaft are provided for use by an operator and wherein motor means are provided to be responsive to the angular position of said shaft to control the angular speed of revolution of said shaft carrier.

4. A vehicle steering system in accordance with claim 3 wherein said motor means revolves the shaft carrier of each driving unit at uniform opposite rotary speeds and wherein the speed of revolution of said shaft carrier is a function of the instantaneous angular position of said steering shaft.

5. A vehicle steering system in accordance with claim 4 wherein said steering shaft has a central neutral position at which said motor means is non-responsive, wherein opposite angular movement of said shaft from said neutral position generates opposite rotary motions of said motor means, and wherein the speed of said motor means increases with angular deviation of said steering shaft from said neutral position.

6. A vehicle steering system in accordance with claim 1 wherein said one driver gear is said ring gear and wherein the other driver gear is said sun gear.

7. A vehicle steering system in accordance with claim 6 wherein said one driver gear is said sun gear and said other driver gear is said ring gear.

8. A vehicle steering system in accordance with claim 1 wherein said means for controllably revolving said shaft carrier of each unit comprises a steering shaft having means for being rotated by an operator, motor means being speed responsive to the angular position of said steering shaft and being coupled to the shaft carrier of each said units for revolving the same in opposite directions, and said motor means having a speed and a direction of rotation which is a direct function of the angular deviations of said steering shaft from a neutral steering position.

9. A vehicle steering system in accordance with claim 8 wherein a drive shaft is coupled to the motor means, wherein first and second secondary drive shafts are level geared to the drive shaft at right angles and being aligned to extend in opposite directions therefrom thereby having opposing rotational responses from said drive shaft, and wherein said secondary drive shafts are geared respectively to the said shaft carrier of each unit to revolve the same in opposite directions in response to the operation of said motor means.

10. A vehicle steering system in accordance with claim 1 wherein said shaft carrier member comprises an external gear, said external gear having an aperture formed therein, shaft means for coupling said motor drive means to said sun gear, said shaft means extending through said aperture, control gear means meshed with said external gear for controllably revolving the same and hence revolving the axes of said planetary gears.

References Cited

UNITED STATES PATENTS

| | | | |
|---|---|---|---|
| 2,027,218 | 1/1936 | Armington | 180—6.44 X |
| 2,336,912 | 12/1943 | Zimmerman | 180—6.44 X |
| 2,580,946 | 1/1952 | Orshansky et al. | 74—720.5 X |
| 2,780,299 | 2/1957 | Matson | 180—6.44 X |
| 3,316,992 | 5/1967 | Schindler | 180—6.44 X |

FOREIGN PATENTS

| | | |
|---|---|---|
| 1,147,142 | 10/1960 | France. |
| 899,150 | 12/1953 | Germany. |

KENNETH H. BETTS, *Primary Examiner.*

J. A. PEKAR, *Assistant Examiner.*

U.S. Cl. X.R.

74—720.5